July 23, 1963    A. S. PEARSON    3,098,365
COUPLING FOR RODS OR SHAFTS
Filed May 14, 1962

INVENTOR
ARTHUR STANLEY PEARSON,
BY Walter S. Jones
ATTORNEY

United States Patent Office 3,098,365
Patented July 23, 1963

3,098,365
COUPLING FOR RODS OR SHAFTS
Arthur Stanley Pearson, Sherwood, England, assignor to United-Carr Fastener Corporation, Boston, Mass., a corporation of Delaware
Filed May 14, 1962, Ser. No. 194,569
Claims priority, application Great Britain May 16, 1961
2 Claims. (Cl. 64—7)

This invention relates to a universal type coupling for rods or shafts.

According to the present invention a coupling for rods or shafts comprises a male and a female member each made of resilient material and each including a shank-like portion for attachment to an end of a rod or shaft, the shank of the male member having a spherically shaped element at one end provided with laterally projecting spigots and the shank of the female member having a socket element at one end formed with a substantially hemi-spherically shaped cavity corresponding to the dimensions of the spherically shaped element of the male member, the wall of the cavity being resilient for resiliently engaging the element of the male member when inserted and being formed with slots or recesses for receiving the spigots of the male member.

The male and female members are assembled by snapping the ball into the recess such that the spigots are located in the respective slots or recesses. It will be understood that the wall of the recess will be sufficiently flexible to permit this snapping action. Preferably the recess is formed with an inwardly projecting lip or flange at or adjacent to the open end, the ball being snapped past the flange which serves to retain the male member in assembly with the female member.

The shank is formed with an axially extending recess of non-circular cross-section for example D-shape, for receiving a correspondingly shaped end portion of the rod or shaft to be connected.

One embodiment of the invention will now be described by way of example with reference to the accompanying drawings in which.

Figure 1:
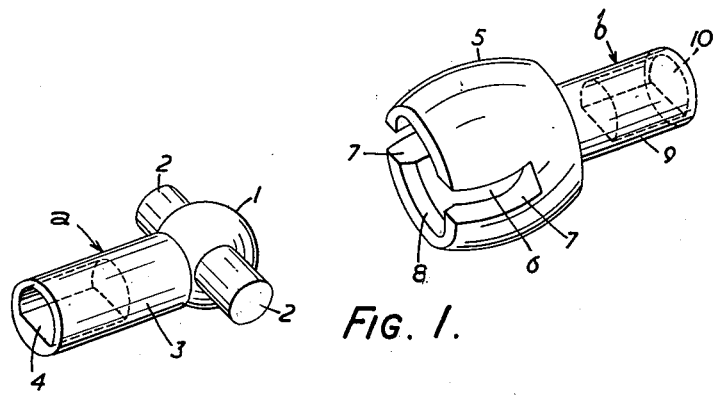
FIG. 1 is a perspective view of the male and female members of a coupling according to one embodiment of the invention.

As shown in FIG. 1 the coupling includes a male member *a* and a female member *b* each formed as a one piece moulding of synthetic plastic. The male member comprises a spherically shaped element 1 having an integral spigot 2 projecting radially from each of two opposite sides. The element 1 is located at one end of a shank 3 which is formed with an axial bore 4 or D-shaped cross-section for receiving a D-shaped end portion of a rod to be connected.

The female member includes a socket 5 formed with a substantially hemi-spherical cavity 6 having an inner diameter substantially corresponding to the outer diameter of the male element 1. The wall of the socket 5 is resilient and formed with opposed slots 7 and an inwardly projecting lip or flange 8 formed at the open end of the cavity. The socket 5 is located at one end of a shank 9 which is formed with an axial bore 10 of D-shaped cross-section for receiving the D-shaped end portion of a rod to be connected.

In use rods or shafts to be connected are assembled with the respective male and female members by inserting the ends into the recesses 4 and 10 in which they are adapted to make a friction tight fit.

The members of the coupling are assembled by presenting the male element 1 to the open end of the cavity 6 and applying axially directed pressure to force the ball into the recess. By reason of the resilient nature of the wall 5 and the fact that the portions thereof between the slots 7 will be very flexible, the male element is readily inserted in the recess by a snapping action to force the element 1 over the flange 8 which then serves to retain the ball against unintentional withdrawal.

Preferably the diameter of the spigots 2 corresponds substantially to the width of the slots 7 such that the spigots make a close fit in the slots to obviate any side play when one of the coupling members is rotated to transmit rotary movement to the other. As the ball and recess are of corresponding shape the male and female members will be permitted a limited degree of angular movement relative to one another and accordingly the coupling is particularly suitable for connecting two rods or shafts which are not exactly in co-axial alignment or which may tend to get out of true alignment in use.

The male and female members preferably comprise one piece mouldings of synthetic plastic material.

Figure 2:
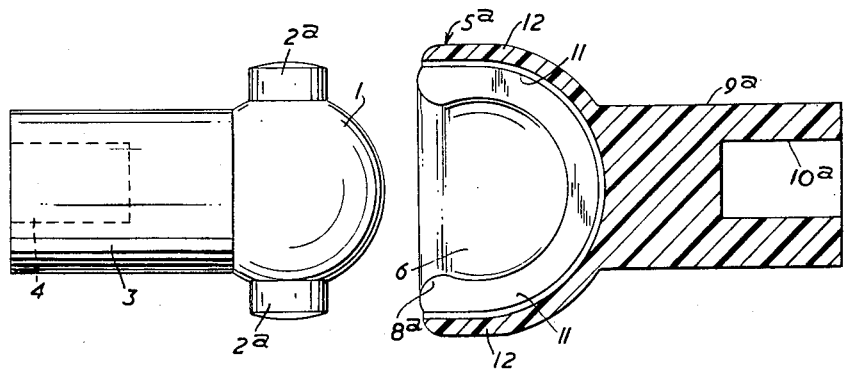
FIG. 2 is a side view of the male and female members of a coupling according to a modification of the invention, the female member being shown in section.
Figure 3:
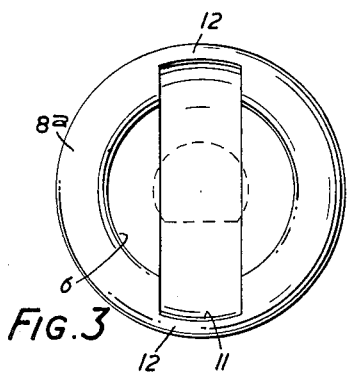
FIG. 3 is an end view of the female member.
Figure 4:
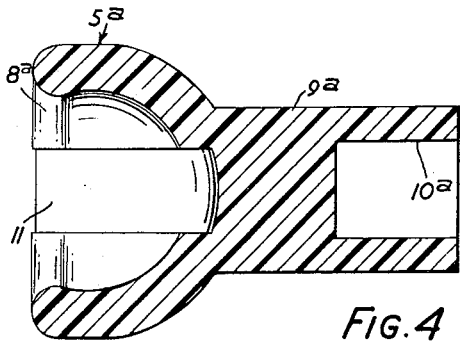
FIG. 4 is a sectional side view thereof take at right angles to the view illustrated in FIG. 2.

As shown in FIGS. 2 to 4 of the drawings, the male member is substantially identical with that shown in FIG. 1 except that the spigots 2a are shorter than the spigots 2 of the first embodiment.

The female element comprises a shank 9a having a D-shaped bore 10a at one end and a socket portion 5a at the other end formed with a substantially hemispherically shaped cavity 6. The open end of the cavity has an inwardly projecting lip 8a and the inner wall of the cavity is formed with a recess which comprises axially extending portions 11 located in opposed relation and whose base portions 12 are formed by thin wall portions of the socket 5a. The depth of the axial portions 11 of the recesses is such as to receive the spigots 2a when the spherical element 1 of the male member is inserted into cavity 6a of the female member.

As in the first embodiment the male and female members are formed respectively as one piece mouldings of synthetic plastic material which is sufficiently resilient to permit the element 1 of the male member to be snapped past the lip 8a into the cavity 6a.

I claim:

1. A coupling for rods or shafts comprising a male and a female member each made of a single piece of resilient synthetic plastic material, and each including a shank-like portion for attachment to an end of a rod or shaft, the shank of the male member having a spherically shaped element at one end provided with laterally projecting integral molded spigots and the shank of the female member having a socket element at one end formed with a substantially hemispherically shaped restricted opening cavity corresponding to the dimensions of the spherically shaped element of the male member, and surrounded by a continuous resilient wall of the cavity for resiliently engaging the element of the male member, when inserted and said wall being formed with slots or recesses for receiving the spigots of the male member.

2. A coupling according to claim 1 wherein the shanks of the male and female members have axially extending bores of noncircular cross-section for receiving correspondingly shaped ends of rods or shafts to be connected.

References Cited in the file of this patent

UNITED STATES PATENTS

| | | |
|---|---|---|
| 897,349 | Coates | Sept. 1, 1908 |
| 1,692,638 | Edwards | Nov. 20, 1928 |
| 2,699,656 | Anderson | Jan. 18, 1955 |
| 2,791,454 | Saives | May 7, 1957 |
| 2,933,754 | Winans | Apr. 26, 1960 |
| 2,993,311 | West | July 25, 1961 |